July 4, 1950        C. W. TURBYFILL        2,513,693
ADJUSTABLE CONTAINER

Filed June 30, 1947        2 Sheets-Sheet 1

Inventor
Charles W. Turbyfill
A. F. Flournoy
Attorney

July 4, 1950  C. W. TURBYFILL  2,513,693
ADJUSTABLE CONTAINER
Filed June 30, 1947  2 Sheets-Sheet 2

Inventor
Charles W. Turbyfill
A. F. Flournoy
Attorney

Patented July 4, 1950

2,513,693

UNITED STATES PATENT OFFICE 2,513,693

ADJUSTABLE CONTAINER

Charles W. Turbyfill, Marshall, Tex.

Application June 30, 1947, Serial No. 758,166

6 Claims. (Cl. 220—7)

My invention relates to containers generally but more in particular to a type of container that is mechanically adjustable to be conveniently stacked one upon the other when filled with articles or the like, or may be made to fit one inside the other when in a nesting position.

A container made according to the teachings of my invention may be used to great advantage when handling articles such as loaves of bread, both in the bakery and in the delivery from the bakery by various delivery vehicles. While in the course of the following description the use of my invention is applied to the handling of loaves of bread, it must be remembered that this is given only as a preferred use of my invention, but other advantageous uses may be made and applied within the scope of my invention as defined by the appended claims.

In the handling of freshly baked loaves of bread, especially when immediate deliveries are to be made, it is desirous that the loaves be placed in containers sufficiently large enough to contain several layers without undue pressure being exerted upon the bottom layer or disfiguring them in any manner.

When using rectangular boxes or containers the deliveryman would often find when he arrived at his point of delivery, that the loaves of the freshly baked bread had settled to such an extent that they were tightly wedged in the container and it was necessary to disfigure at least one loaf of each layer in order to remove them. Such settling of the loaves filled the container so that the deliveryman could not get his fingers between the loaves and the sides of the container.

The former tapered box, that is, a container with the sides and ends tapering downwardly and inwardly from the top, has had just as many objections. When this type of container is used, the deliveryman finds that the upper layer of loaves have settled in their wrappers to such an extent that when they are removed the impression is given that they have not been completely filled. While this tapered container will allow easy loading and removing of the loaves of bread, the objections have been that when they are finally removed at the point of delivery that the loaves are not uniform in length nor present a neat, full appearance which is a major selling point in an article of this type.

It is desirous, therefore, in a container for loaves of bread or the like, that the container be of such construction and design as to house a multiplicity of loaves in such a manner that the loaves are prevented from shifting or sliding whereby they might be distorted or disfigured. It is also highly desirous that the container be made to expand or otherwise disjoint itself whereby the loaves may be easily removed therefrom. In this instance, however much the loaves have settled due to the jarring or jolting of the vehicle in which they have been placed, they will be uniform in size and retain the original shape as when taken from the baking oven.

An object of my invention is to provide a container for loaves of bread or the like that may be placed one upon another in interlocked relationship, the bottom of one of the containers fitted upon the top of another of the containers in a manner to keep them from separating or sliding.

Another object of my invention is to provide a container for loaves of bread or the like wherein the sides of the container may be mechanically separated for the removal of bread or the like therefrom.

Another object of my invention is to provide a container for loaves of bread or the like wherein the sides of the container may be adjusted from their normally closed, parallel relationship to an open position wherein the sides assume a downward inclination sufficient to allow one container to be placed within the other in a nesting position.

A further object of my invention is to provide a container that may be mechanically adjusted to stack one upon the other or to nest one in the other, the containers being provided with stops whereby one container may nest in another container to a given depth only, thus allowing free separation of the containers regardless of how many are so nested.

A further object of my invention is to provide a container for loaves of bread or the like having a screw mechanism attached to each end thereof whereby the sides of the container may be made open or closed at a single stroke of the adjusting screw mechanism.

Other objects and advantages will be found in the following detailed description and appended claims when viewed together with the accompanying drawing in which:

Figures 1, 2:
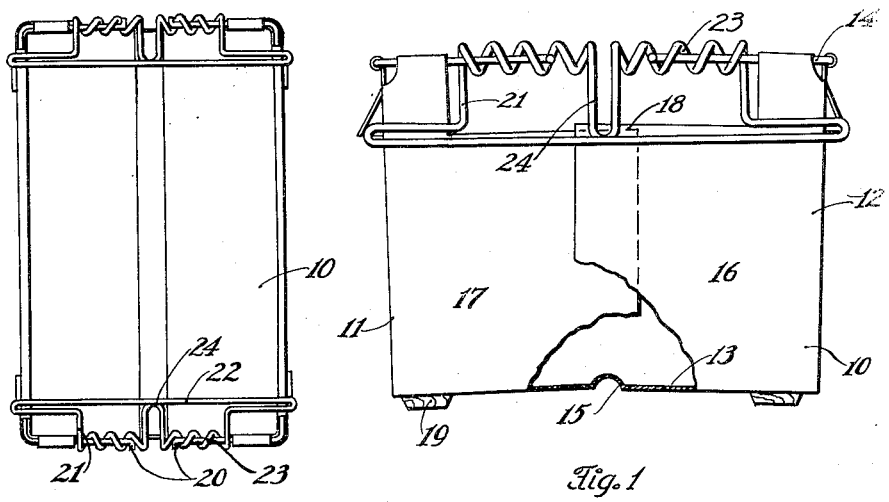
Fig. 1 is a partially broken end view of a device embodying my invention in an adjustable container.
Fig. 2 is a top view thereof.

In the drawing numeral 10 designates my container generally which is made rectangular in shape to conform to any convenient area or volume whereby loaves of bread or the like may be uniformly positioned and stacked therein.

The sides 11 and 12 and the bottom 13 are made, in this instance, of single pieces of material, the extreme ends thereof being folded over, or otherwise attached to, a framing member 14. It will be noted that on the bottom 13, running the length of the container, I have provided a crimp or folded offset 15, the purpose of which will be described later.

Each end of the container is made of two separate pieces 16 and 17 the tops of which are attached to the framing member 14 in a manner according to the sides 11 and 12; the outer edges thereof being folded over or lapped over the sides 11 and 12 and bottom 13 and riveted, welded or otherwise attached thereto.

Each of the end pieces 16 and 17 has a portion of the top thereof cut away and one of the end pieces 16 is provided with a lip 18 which overlaps the opposite end piece 17 in a slidable relationship.

Figure 3:
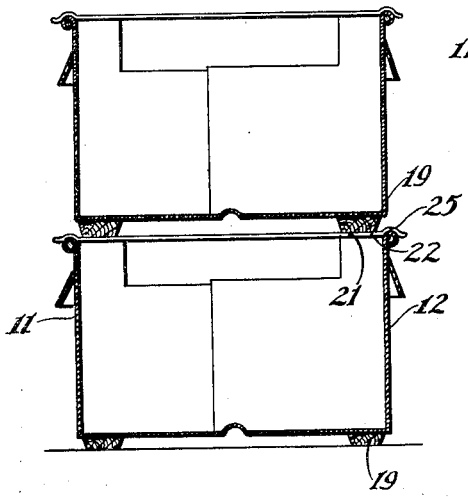
Fig. 3 is an end elevational view showing a pair of my containers in a stacked relationship.
Figure 5:
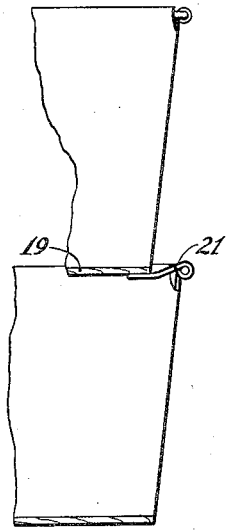
Fig. 5 is a partially broken side view showing the position of the runner elements of my invention when two containers are in a stacked relationship.

On the bottom 13 of the container I have placed suitable runners 19 which act as positioning members when the containers are stacked in the manner as illustrated by Figs. 3 and 5.

It will be noted that the framing member 14 is not joined at each end of the container but is provided with spaced, right angular bends 20 which act as a single thread for the adjustable mechanism designated generally by the numeral 21. This adjustable mechanism 21 consists of a substantially large wire or the like folded upon itself in a manner to span the breadth of the container with one of its legs 22 and to be wound upon the framing member 14 with the opposite leg. These windings constitute screw threads of opposite helix; and when co-acting with the ends of the framing member 14, will draw together or separate the sides 11 and 12 of the container 10 according to the position of the conveniently formed handle 24.

A typical use of my container might be as follows. With the container in the open position as shown in Fig. 1 it is ready to receive loaves of bread or the like. The adjusting mechanism 21 lies flat against the outside ends of the container, hence the oppositely wound threads have opened the sides from their normal parallel position as shown by the dotted lines. This allows room for an operator or loader to place his fingers between the ends of the loaves of bread and the sides of the container. Note that the solid bottom will bend slightly along the crimped portion 15 and allow the slidably locked, two pieced ends to assume the position shown. It must also be remembered that the adjusting mechanism 21, especially the end members 23 of the framing member 14, will be thrown slightly out of a perfectly horizontal plane due to the opening of the container. There is very little play between the outside diameter of the end members 23 of the framing member 14 and the inside diameter of the helically wound threaded portion of the adjusting mechanism 21. The right angular bends 20 are just as snug in the helically wound threaded portion and have no more backlash than a common turned or rolled thread of the same size.

When the sides are completely opened the right angular bends 20 do not take up the complete thread as is shown in Fig. 1. The remaining threads act as a bushing or support to help stabilize the ends of the container. Since the threaded portion of the adjusting mechanism is just a helically wound coil, there is sufficient resiliency to allow distortion between the end members 20 whereby the sides may be opened to a considerable degree without effecting the operability of the adjusting mechanism. This would not be true in the case of an ordinary turnbuckle or other oppositely threaded members which would have to be adjusted in the same plane.

When the container is filled, the handle portion 24, on each end thereof is pivoted to a position inside the container, horizontal with the bottom 13. This action advances the oppositely wound threads of the adjusting mechanism 21 along the bent ends 20 of the framing member 14 in a manner to draw in the sides 11 and 12 of the container 10 where they will be substantially parallel.

When two of the containers are thus filled they may be stacked in the manner as shown in Fig. 3 with the runners 19 resting upon one of the legs 22 of the adjusting mechanism 21. It will be noted also that the extreme ends of this leg member 22 are bent to a substantially oval shape 25 thus providing stops for the runners 19 against any side slippage that might occur.

The tops of the end members, as shown in Fig. 5 are spaced to a distance slightly greater than the bottoms thereof hence they will always be in a downwardly tapering plane and will allow the runners 19 to be fitted up against them to prevent any endwise slippage of another container that is stacked thereon.

Such a stacking arrangement is highly advantageous when loading my containers for temporary storage or when placing them in delivery trucks or the like.

When it is desired to remove the loaves of bread or the like from my container 10, an operator simply spreads the side walls 10 and 11 by a substantal half-turn of the handle 24 of the adjusting mechanism 21 on each end of the container 10. He is now able to reach his fingers down between the loaves of bread or the like and the side walls of the container and easily remove them.

Figure 4:
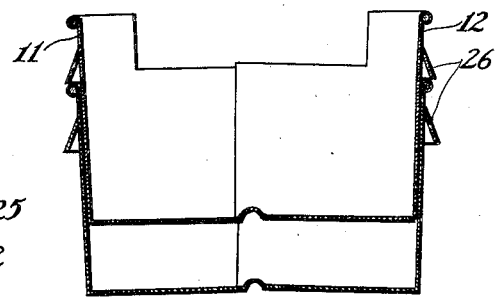
Fig. 4 is a sectional view showing my containers in a nesting position.

When the containers are emptied, they are left in the open position and nested in the manner illustrated by Fig. 4. It will be noted that the tapered side walls allow one container to be fitted neatly into another container whereby a maximum number of them may be stored in a minimum space. On the upper edges of the sides 11 and 13 of the container, I have provided suitable stops 26 which, when one container is nested in another to prevent freezing or sticking such as might occur in other wedge-shaped containers. These stops 26 are so positioned that they will leave a small space between the walls of one container and the walls of another container into which it is nested. No matter how much weight is then placed upon the bottom container by the above nested therein, it can be separated easily one from the others due to the arrangement of the stops as just described.

These stops 26 may be formed of the sides 11 and 12 or may be separately attached thereto. They may also act as handles when handling or moving the containers.

Figure 6:
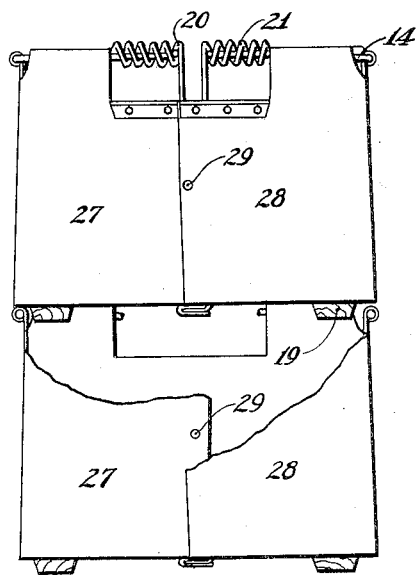
Fig. 6 is a partially broken view of a pair of containers in modified form as shown in a stacked position.
Figure 7:
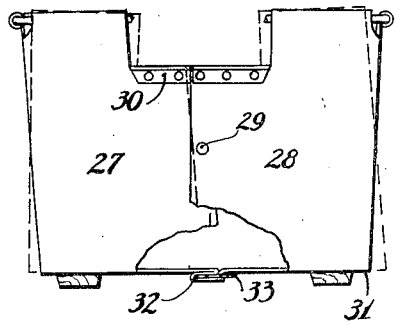
Fig. 7 is a partially broken end view of my modified container showing its adjustment in dotted lines.
Figure 8:
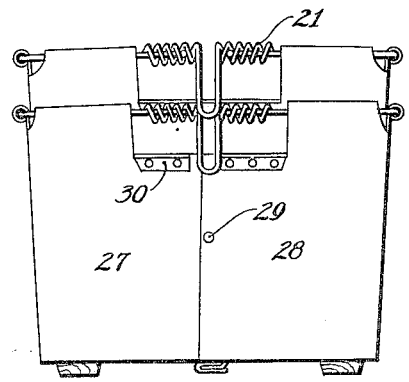
Fig. 8 shows the same modified containers in a nesting position.

Figs. 6, 7 and 8 show my invention in modified form. In this instance the end pieces 27 and 28 are connected to the upper framing member 14 and the sides 11 and 12 and the bottom 13 as formerly described. The overlapping inside edges of the end pieces 27 and 28 are pivotally mounted by a pivot pin 29 that is positioned substantially in the center of the container end. The upper cut out portion is provided with angle members 30 riveted or otherwise fastened along the cut out edges thereof with a leg of the container. Thus when the adjusting mechanisms 21 are actuated for a stacking position the sides of the containers will assume the positions as shown in Fig. 6. It will be noted here that the distance across the upper side of the container is slightly less than the distance across the bottom thereof. Such an arrangement allows the bottom of the container to be placed upon the top of another container in an overlapping manner whereby the runners 19 will act as stops to prevent side or end slipping.

When the adjusting mechanism is actuated into the open position the container will assume the shape as shown by Fig. 7; that is, the end pieces will pivot around the pivot pin 29 thus drawing in the side members at the bottom of the container and expanding them at the top. The containers, in this shape may be nested one inside the other for convenient storage as illustrated in Fig. 8.

When nested, the angle members 30 rest directly upon a portion of the adjusting mechanism 21 to allow the container to be freely removed from the one in which it is nesting.

In the modified form of my invention the side members partially form the bottom 31. It will be seen in Fig. 7 that the center seam along the bottom is made by forming a receiving slot 32 in one edge of one of the bottom pieces to receive the projecting edge 33 of the opposite piece. Thus when the end pieces 27 and 28 pivot to a new position the bottom piece 33 will slide into the receiving slot 32 with a corresponding movement.

It must be remembered that in handling loaves of bread, fruit, small packaged goods or any perishable item or where deliveries must be made quickly, time is a most important factor. An operator cannot waste time trying to remove his goods or wares from a tightly packed container nor subject his hands to injury by the constantly forcing them down between the wares and the sides of the container.

While I have described a particular container in detail both in a preferred and modified form it is to be understood that the shape and size is of no consequence and that the materials of construction or other variation of my invention may be made without departing from the spirit and scope thereof as falls within the purview of the following claims.

I claim:

1. An adjustable container comprising an open box-like structure including sides, bottom and end members, an upper framing member attached thereto, and adapted to position said side and end members in spaced relationship; said upper framing member comprising non-joined sections of a rod or the like whose non-joined ends terminate in sharp, right angular bends spaced substantially centrally of the width of said end member; a wire or the like wound around the ends of said framing member sections and embracing the opposed right angular bends of the same, windings of said wire constituting threads of opposite helix whereby the ends of said framing member sections are adapted to advance or recede into said windings by rotary motions of said wire or the like.

2. The device as claimed in claim 1 wherein said windings are cooperatively mounted on each end of said container and provided with a handle for rotating the same.

3. The device as claimed in claim 2 wherein said end members provide a stopping means for said handles when said container is in an openly adjusted position.

4. The device as claimed in claim 3 wherein said windings wound upon the non-joined ends of said framing member sections are made long enough to bearingly support said ends of said framing member sections.

5. A shipping box comprising a body including a bottom, side members secured to the bottom, slidably and medially overlapping end sections joined to the ends of the side members, each side and its joined end sections being movable from a position wherein the sides are substantially vertical to a position wherein the sides are inclined outwardly, frame members comprising a U-shaped rod secured to the upper edges of each side and its joined end sections, with the ends of the rods in opposed spaced relation, laterally extended lugs formed on the ends of the rods, a wire wound around the adjacent ends of the U-shaped frame members and rotatably embracing the same, the windings of said wire constituting threads of opposite helixes within which the lugs operate respectively, the ends of said wire projecting laterally to form operating handles therefor, whereby the ends of said framing members may be made simultaneously to advance or recede into said windings by rotary motion of said helixes and correspondingly move each side and its joined end sections from a position wherein the sides are substantially vertical to a position wherein the sides are inclined outwardly.

6. In a shipping box a body having opposite walls each comprising a pair of relatively movable wall sections, rods extended toward each other from the sections of each pair, lugs on the rods, and a handle member mounted rotatably on the rods and having its end portions formed with threads of opposite helixes, said lugs engaged in the threads for movement of the wall sections toward each other responsive to handle member rotation in one direction, and away from each other responsive to handle member rotation in the opposite direction.

CHARLES W. TURBYFILL.

REFERENCES CITED

The following references are of record in the file of this patent:

UNITED STATES PATENTS

| Number | Name | Date |
|---|---|---|
| 311,951 | Bright | Feb. 10, 1885 |
| 919,478 | Simpson | Apr. 27, 1909 |
| 1,124,875 | Dishmaker | Jan. 12, 1915 |
| 1,187,749 | Lane | June 20, 1916 |
| 1,302,253 | Wallace | Apr. 29, 1919 |
| 2,244,841 | Johnson | June 10, 1941 |
| 2,358,457 | Jackson | Sept. 19, 1944 |
| 2,395,542 | Fordon | Feb. 26, 1946 |